A. Fulton,
Piston Packing.
Nº 48,547. Patented July 4, 1865.
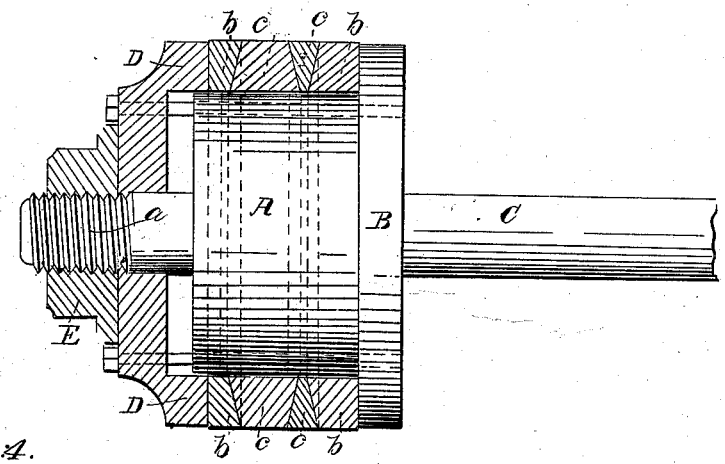
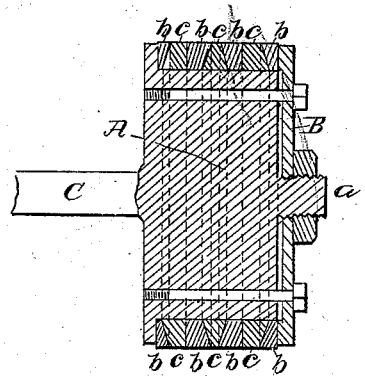
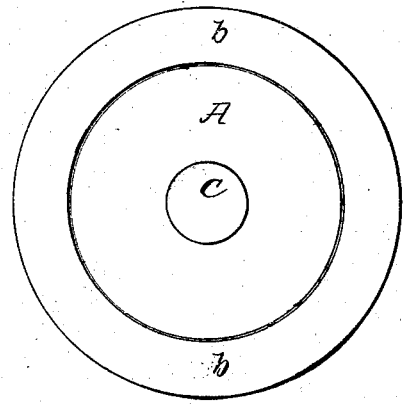
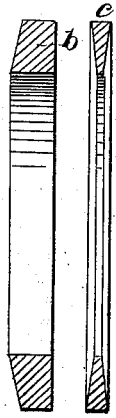
Witnesses:
R. F. Campbell.
E. Schafer.
Inventor:
Andrew Fulton
by his Atty.
Mason Fenwick & Lawrence

UNITED STATES PATENT OFFICE.

ANDREW FULTON, OF PITTSBURG, PENNSYLVANIA.

IMPROVED PISTON-PACKING.

Specification forming part of Letters Patent No. 48,547, dated July 4, 1865.

*To all whom it may concern:*

Be it known that I, ANDREW FULTON, of Pittsburg, county of Allegheny, and State of Pennsylvania, have invented new and Improved Piston-Packing Rings; and I do hereby declare that the following is a full, clear, and exact description thereof, reference being had to the accompanying drawings, making a part of this specification, in which—

Figure 1 is a sectional view of a piston, showing the manner of applying the packing-rings. Figs. 2 and 3 show the packing-rings detached from the piston.

Similar letters of reference indicate corresponding parts in the three figures.

This invention relates to the piston-packing which formed the subject of my Patent No. 7,241 in so far as that I employ the compound metallic packing-ring, which is made up of hard and soft metal rings and confined between the flanged heads of the piston.

The object of my present improvement is to combine with the uncut hard and soft metal packing-rings the wedge form or principle in such manner that all the advantages due to the employment of hard and soft metal rings are secured, and the additional advantages of more ready and perfect expansion diametrically of the soft packing, and of expanding each soft ring or two soft rings together by the direct pressure of hard rings upon the same, instead of depending upon pressure of hard rings applied only at the ends of the piston.

To enable others skilled in the art to understand my invention, I will describe its construction and operation.

In the accompanying drawings, A represents the cylindrical hub of the piston, and B a flange, which is formed on one end thereof, and which is somewhat greater in diameter than the hub. C is the piston-rod, which passes through the hub A, and has a male screw-thread formed on its end $a$, as shown in Fig. 1.

A flange or piston-head, D, having an annular recess of the same diameter as the hub formed in it, is slipped upon the end $a$ of the rod C, and set up against the packing-rings $b\ c$ by means of a nut, E. The diameter of the two flanges B and D are equal, and slightly less than the diameter of the packing-rings, so that the circumference of these rings only may impinge against the sides of the cylinder within which the piston works.

The rings $b\ c$ are made of hard and soft metals—that is to say, the rings $b\ b$, which are nearest the flanges of the piston, are made of hard metal, and those lettered $c$, which are interposed between the hard rings, are made of a softer metal. The object of such an arrangement of the rings is fully set forth in my patent, but I will briefly state that by having the hardest metal rings nearest the flanges, or the follower and flange of the piston, the softer metal rings are prevented from squeezing out and projecting over the circumference of said parts.

Instead of having all the soft-metal rings together it may be found desirable to arrange them so as to alternate with the harder metal rings.

The rings which abut against the flanges B and D should have one flat side, as represented, unless these flanges are beveled. The chamfering or beveling of these rings enables me to expand them more readily by setting up the follower D and nut E, and with less expenditure of power than if the sides of said rings were flat or perpendicular to the surface of the hub A. The beveled or wedged surfaces abutting against each other will be found to give way more readily under the crushing force which is applied to the nut E, and the rings of soft metal will be expanded diametrically and uniformly, so as to increase the circumference of the piston. By recessing the follower D so that it will fit over the hub A a greater or less number of rings may be employed, as occasion requires.

Fig. 4 is a diametrical section through a piston, wherein a greater number of soft and hard metal rings are employed than in Fig. 1, and wherein screw-bolts are used, in addition to the nut E, for securing the follower and piston-head together. These bolts may be arranged around the axis of the piston, and any desired number of them may be employed, according to the diameter of the piston.

I do not claim the use of rubber in combination with hard metal rings; but,

Having thus described my invention, what I claim as new, and desire to secure by Letters Patent, is—

The constructing of the packing of a piston so as to operate as herein described, by arranging uncut hard and soft metal rings b c b c, of the wedge form described, upon a hub, A, and between heads B D, one of which is adjustable lengthwise of the rod C, the said soft and hard metal rings being disposed in the order substantially as described, all for the purpose set forth.

A. FULTON.

Witnesses:
 JAS. VEECH,
 A. S. NICHOLSON.